US008615083B2

(12) United States Patent
Yang

(10) Patent No.: US 8,615,083 B2
(45) Date of Patent: Dec. 24, 2013

(54) METHOD FOR ACCESSING TO RADIO FREQUENCY COMMUNICATION WITH LOW-FREQUENCY ELECTROMAGNETIC COMMUNICATION

(75) Inventor: Xianwei Yang, Nanshan District (CN)

(73) Assignee: Nationz Technologies Inc., Shenzhen (CN)

( * ) Notice: Subject to any disclaimer, the term of this patent is extended or adjusted under 35 U.S.C. 154(b) by 0 days.

(21) Appl. No.: 13/696,025

(22) PCT Filed: Jun. 3, 2010

(86) PCT No.: PCT/CN2010/073509
§ 371 (c)(1),
(2), (4) Date: Jan. 18, 2013

(87) PCT Pub. No.: WO2011/137600
PCT Pub. Date: Nov. 10, 2011

(65) Prior Publication Data
US 2013/0108049 A1    May 2, 2013

(30) Foreign Application Priority Data

May 5, 2010   (CN) .......................... 2010101630645

(51) Int. Cl.
*H04L 29/06*        (2006.01)
(52) U.S. Cl.
USPC ........................................................ 380/270
(58) Field of Classification Search
USPC .................. 380/270, 44; 726/2; 713/162, 168
See application file for complete search history.

(56) References Cited

U.S. PATENT DOCUMENTS

| 6,321,079 | B1 * | 11/2001 | Cooper | 455/411 |
| 6,323,566 | B1 * | 11/2001 | Meier | 307/10.2 |
| 7,925,535 | B2 * | 4/2011 | Beenau et al. | 705/16 |
| 8,160,548 | B2 * | 4/2012 | Aaron | 455/411 |
| 2003/0028814 | A1 * | 2/2003 | Carta et al. | 713/202 |
| 2005/0187882 | A1 * | 8/2005 | Sovio et al. | 705/64 |

FOREIGN PATENT DOCUMENTS

| CN | 1787663 A | 6/2006 |
| CN | 101211401 A | 7/2008 |
| WO | WO 2005/098770 A1 | 10/2005 |

OTHER PUBLICATIONS

PCT/CN2010/073509 International Search Report dated Jan. 11, 2011.

* cited by examiner

*Primary Examiner* — Ali Abyaneh
(74) *Attorney, Agent, or Firm* — Foley & Lardner LLP

(57) ABSTRACT

A method for accessing to radio frequency communication with low-frequency electromagnetic communication is provided. A request side sends an activation request including first random data via a low frequency channel. A requested side receives the activation request, generates and sends an activation response message, including second random data and an identifier of the requested side, according to the first radio frequency communication address. The request side receives and verifies the activation response message, and if the verification is passed, generates and sends a connection request, including third random data, according to the second radio frequency communication address. The requested side receives and verifies the connection request and if the verification is passed, generates and sends a connection response message according to the second radio frequency communication address. The request side receives the connection response message and verifies whether the connection is successful, and if successful, trades with the requested side.

17 Claims, 2 Drawing Sheets

METHOD FOR ACCESSING TO RADIO FREQUENCY COMMUNICATION WITH LOW-FREQUENCY ELECTROMAGNETIC COMMUNICATION

FIELD OF THE INVENTION

The present invention relates to the communication field, in particular to a method for accessing radio frequency communication with low-frequency magnetic communication.

DESCRIPTION OF THE PRIOR ART

Along with the development of electronic payment technologies, electronic and mobile payment means are an inevitable and sure trend. Mobile payment combines the portability of mobility and independence of electronic payment. The vast amount of mobile users lays down an excellent foundation for the development of mobile payment. Therefore, mobile payment will have a tremendous market, wherein a short-range communication system consisted of a radio frequency SIM card with low-frequency magnetic communication and a card reader thereof is a typical application of mobile payment. In the short-range communication system consisted of a radio frequency SIM card with low-frequency magnetic communication and a card reader thereof, low-frequency magnetic communication is used for range control and transactions are completed via radio frequency communication.

When the radio frequency SIM card with low-frequency magnetic communication is used as a bus card, an access card, a credit card, a small amount payment card, an attendance card and other intelligent cards, it is typically necessary to complete the access authentication of the radio frequency SIM card and the entire transaction within an extremely short period so as to enhance the convenience of the radio frequency SIM card's application as an identification or small amount payment tool.

In existing short-range communication systems of radio frequency SIM cards with low-frequency magnetic communication, low-frequency channels are introduced and as a result, the physical properties of the low-frequency channels determine that its data transmission rate cannot be very high, leading to a relatively low access rate. Therefore, the entire access rate of the system with low-frequency magnetic communication is lower than the access rate of pure radio frequency communication. To a certain degree, it increases the time overhead of access and consequently increases the time overhead of the entire transaction, which affects the user satisfaction in some applications to a certain degree. At the same time, the existing short-range communication systems of radio frequency SIM cards with low-frequency magnetic communication do not consider the authentication between the requesting party and the requested party in the access process, and in the subsequent communication, data are not encrypted, leading to certain data security risks.

SUMMARY OF THE INVENTION

The technical problem that the present invention intends to solve is to provide a method for accessing radio frequency communication with low-frequency magnetic communication, speed up the radio frequency communication access rate of a short-range communication system with low-frequency magnetic communication, and improve user satisfaction.

The present invention proposes a method for accessing radio frequency communication with low-frequency magnetic communication to solve the above technical problem, comprising:

Step a: a requesting party sends an activation request through a low-frequency channel, namely a low-frequency characteristic code, wherein said low-frequency characteristic code comprises a first random number generated by the requesting party;

Step b: a requested party receives the activation request through the low-frequency channel, generates an activation response message and sends the activation response message on a first radio frequency communication address through the radio frequency channel, wherein the activation response message comprises a second random number generated by the requested party and an identity identifier of the requested party;

Step c: the requesting party receives the activation response message on the first radio frequency communication address through the radio frequency channel and performs the verification, generates a connection request if the verification is passed, and sends the connection request on a second radio frequency communication address through the radio frequency channel, wherein the connection request comprises a third random number;

Step d: the requested party receives the connection request on the second radio frequency communication address through the radio frequency channel and performs the verification, generates a connection response message if the verification is passed, and sends the connection response message on the second radio frequency communication address through the radio frequency channel;

Step e: the requesting party receives the connection response message on the second radio frequency communication address through the radio frequency channel, verifies whether the access is successful, and trades with the requested party on the second radio frequency communication address through the radio frequency channel if the access is successful.

Furthermore, the above method may further have the following features: the length of said low-frequency characteristic code is shorter than or equal to 2 bytes.

Furthermore, the above method may further have the following features: said low-frequency characteristic code only comprises said first random number, and the length of said first random number is 1 byte.

Furthermore, the above method may further have the following features: said Step b comprises:

Step b1, the requested party receives the activation request through the low-frequency channel;

Step b2, the requested party generates a second random number;

Step b3, the requested party calculates the frequency of the radio frequency communication according to the frequency calculation method predetermined by the two parties and based on the first random number in said activation request and the maximum number of frequency points supported by the radio frequency channel;

Step b4, the requested party calculates the first radio frequency communication address according to the address calculation method predetermined by the two parties and based on the first random number;

Step b5, the requested party generates a first encryption identifier, said first encryption identifier containing the method to encrypt transaction sessions selected by the requested party and the supporting encryption algorithm;

Step b6, the requested party uses said second random number, the identity identifier of the requested party and said first encryption identifier as the encryption input, uses said first random number and second random number as the encryption key, adopts a predetermined encryption algorithm to perform the encryption operation, and takes the first 4 bytes of the encryption result as the first check code;

Step b7, the requested party generates an activation response message, said activation response message comprising said second random number, the identity identifier of the requested party, the first encryption identifier and the first check code;

Step b8, the requested party sends said activation response message on the first radio frequency communication address at the calculated frequency of the radio frequency communication through the radio frequency channel.

Furthermore, the above method may further have the following features: in said Step b2, the length of said second random number is 4 bytes.

Furthermore, the above method may further have the following features: in said Step b3, said predetermined frequency calculation method is: with the maximum number of frequency points supported by the radio frequency channel as the mode, performing an operation to obtain remainder on said first random number, the obtained remainder corresponds to the numbering of the frequency used by the radio frequency communication, and said frequency of the radio frequency communication is obtained according to said numbering.

Furthermore, the above method may further have the following features: in said Step b5, it means that there is no encryption when said first encryption identifier equals to 0, and it means that there is encryption and the encryption is performed with the algorithm identified by the first encryption identifier when said first encryption identifier does not equal to 0.

Furthermore, the above method may further have the following features: in said Step b6, the encryption input is RN2∥ID2∥ALG1, and the encryption key is RN1∥RN2, wherein "∥" represents concatenation.

Furthermore, the above method may further have the following features: said Step c comprises:

Step c1, the requesting party calculates the frequency of the radio frequency communication according to the frequency calculation method predetermined by the two parties and based on the first random number and the maximum number of frequency points supported by the radio frequency channel;

Step c2, the requesting party calculates the first radio frequency communication address according to the address calculation method predetermined by the two parties and based on the first random number;

Step c3, the requesting party receives said activation response message on the first radio frequency communication address at the calculated frequency of the radio frequency communication through the radio frequency channel;

Step c4, the requesting party uses the second random number, the identity identifier of the requested party and said first encryption identifier in said activation response message as the encryption input, uses said first random number and second random number as the encryption key, adopts a predetermined algorithm to perform the encryption operation, takes the first 4 bytes of the encryption result as the first check code, and then compares said first check code with the first check code contained in said activation response message, if the two are identical, then the verification is passed, and go to Step c5; otherwise, the access is incorrect and this access process is terminated;

Step c5, the requesting party generates a third random number;

Step c6, the requesting party generates a second encryption identifier, said second encryption identifier containing the method to encrypt transaction sessions selected by the requesting party and the supporting encryption algorithm;

Step c7, the requesting party uses said third random number, the identity identifier of the requesting party and said second encryption identifier as the encryption input, uses said first random number, second random number and third random number as the encryption key, adopts a predetermined encryption algorithm to perform the encryption operation, and takes the first 4 bytes of the encryption result as the second check code;

Step c8, the requesting party generates a connection request, said connection request containing said third random number, the identity identifier of the requesting party, the second encryption identifier and the second check code;

Step c9, the requesting party calculates the second radio frequency communication address according to the address calculation method predetermined by the two parties and based on the first random number and second random number;

Step c10, the requesting party sends said connection request on the second radio frequency communication address at the frequency of the radio frequency communication through the radio frequency channel.

Furthermore, the above method may further have the following features: in said Step c5, the length of said third random number is 3 bytes.

Furthermore, the above method may further have the following features: in said Step c7, the encryption input is RN3∥ID1∥ALG2, and the encryption key is RN1∥RN2∥RN3, wherein "∥" represents concatenation.

Furthermore, the above method may further have the following features: in said Step c9, said calculation method of the second radio frequency communication address is: with said first random number and second random number as input, performing a predetermined one-way function operation, and making all or a part of the obtained operational results as the second radio frequency communication address.

Furthermore, the above method may further have the following features: in said Step c9, said calculation method of the second radio frequency communication address is: taking all or a part of RN1∥RN2 as the second radio frequency communication address, wherein "∥" represents concatenation.

Furthermore, the above method may further have the following features: said Step d comprises:

Step d1, the requested party calculates the second radio frequency communication address according to the address calculation method predetermined by the two parties and based on the first random number and second random number;

Step d2, the requested party receives said connection request on the second radio frequency communication address at the frequency of the radio frequency communication through the radio frequency channel;

Step d3, the requested party uses the third random number, the identity identifier of the requesting party and the second encryption identifier in said connection request as the encryption input, uses said first random number, second random number and third random number as the encryption key, adopts a predetermined encryption algorithm to perform the encryption operation, takes the first 4 bytes of the encryption result as the second check code, and then compares said second check code with the second check code contained in said connection request, if the two are identical, then the verification is passed; otherwise, the verification is failed;

Step d4, the requested party sets a status identifier of connection successful/failed according to the verification result of the second check code. If the second check code passes the verification, then said status identifier of connection successful/failed is set to connection successful, and go to Step d5; otherwise, said status identifier of connection successful/failed is set to connection failed, and go to Step d6;

Step d5, the requested party generates a third encryption identifier, said third encryption identifier containing the method to encrypt transaction sessions finally selected by the requested party and the supporting encryption algorithm;

Step d6, the requested party uses the third random number, the status identifier of connection successful/failed and the third encryption identifier as the encryption input, uses said first random number, second random number and third random number as the encryption key, adopts a predetermined encryption algorithm to perform the encryption operation, and takes the first 4 bytes of the encryption result as the third check code;

Step d7, the requested party generates a connection response message, said connection response message containing the status identifier of connection successful/failed, the third encryption identifier and the third check code;

Step d8, the requested party sends said connection response message on the second radio frequency communication address through the radio frequency channel.

Furthermore, the above method may further have the following features: in said Step d6, the encryption RN3||SFF||ALG3, and the encryption key is RN1||RN2||RN3, wherein "||" represents concatenation.

Furthermore, the above method may further have the following features: said Step e comprises:

Step e1, the requesting party receives said connection response message on the second radio frequency communication address through the radio frequency channel;

Step e2, the requesting party uses the third random number, the status identifier of connection successful/failed and the third encryption identifier in said connection response message as the encryption input, uses said first random number, second random number and third random number as the encryption key, adopts a predetermined encryption algorithm to perform the encryption operation, takes the first 4 bytes of the encryption result as the third check code, and then compares said third check code with the third check code contained in said connection response message, if the two are identical, then the verification is passed, and go to Step e3; otherwise, the verification is failed and this access process is terminated;

Step e3, the requesting party determines whether the access by the requested party is successful or not based on the status identifier of connection successful/failed in said connection response message, if the access fails, then this access process is terminated; otherwise, go to Step e4;

Step e4, the requesting party and the requested party conduct transactions on the second radio frequency communication address through the radio frequency channel.

Furthermore, the above method may further have the following features: in said Step e4, a session encryption key is used in said transactions.

Furthermore, the above method may further have the following features: said session encryption key is 8-bytes RN1||RN2||RN3 or 16-bytes RN1||RN2||RN3||$\overline{RN1||RN2||RN3}$, wherein "||" represents concatenation and $\overline{RN1||RN2||RN3}$ is the bit-by-bit inversion of RN1||RN2||RN3.

The method for accessing radio frequency communication with low-frequency magnetic communication according to the present invention can speed up the radio frequency communication access rate of a short-range communication system with low-frequency magnetic communication and improve user satisfaction.

DETAILED DESCRIPTION OF THE PREFERRED EMBODIMENTS

The principles and features of the present invention will be described below with reference to the accompanying drawings. The embodiment is only to describe the present invention, and not to limit the scope of the present invention.

Figure 1:
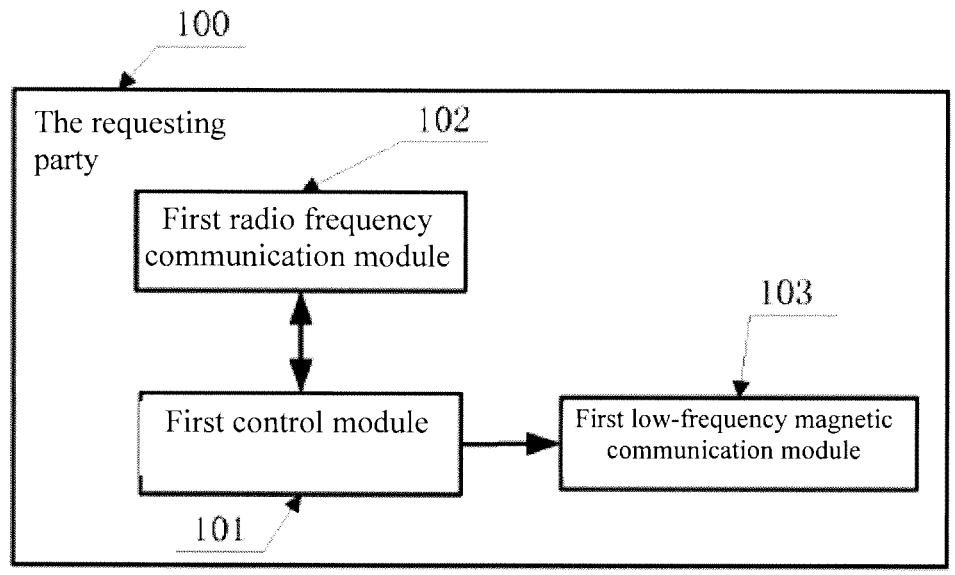
FIG. 1 is a block diagram of the structure of the requesting party.
Figure 2:
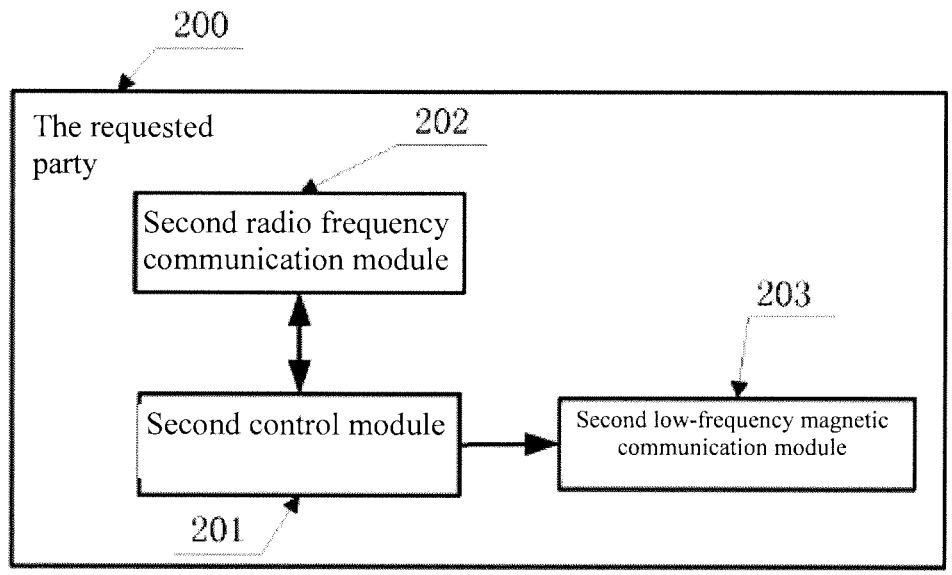
FIG. 2 is a block diagram of the structure of the requested party.

First, structures of the requesting party and the requested party in the system that employs the method for accessing radio frequency communication with low-frequency magnetic communication according to the present invention will be described. FIG. 1 is a block diagram of the structure of the requesting party. As shown in FIG. 1, the requesting party 100 comprises at least one first control module 101, at least one first radio frequency communication module 102, and at least one first low-frequency magnetic communication module 103. The first control module 101 is at least connected to one first radio frequency communication module 102 and at least one first low-frequency magnetic communication module 103. FIG. 2 is a block diagram of the structure of the requested party. As shown in FIG. 2, the requested party 200 comprises at least one second control module 201, at least one second radio frequency communication module 202, and at least one second low-frequency magnetic communication module 203. The second control module 201 is at least connected to one second radio frequency communication module 202 and at least one second low-frequency magnetic communication module 203. Of course, only representative structures of the requesting party and the requested party are provided herein. In other embodiments, a plurality of modules of the requesting party and the requested party can be combined into a large module, and alternatively, one module can be divided into a plurality of small modules.

Figure 3:
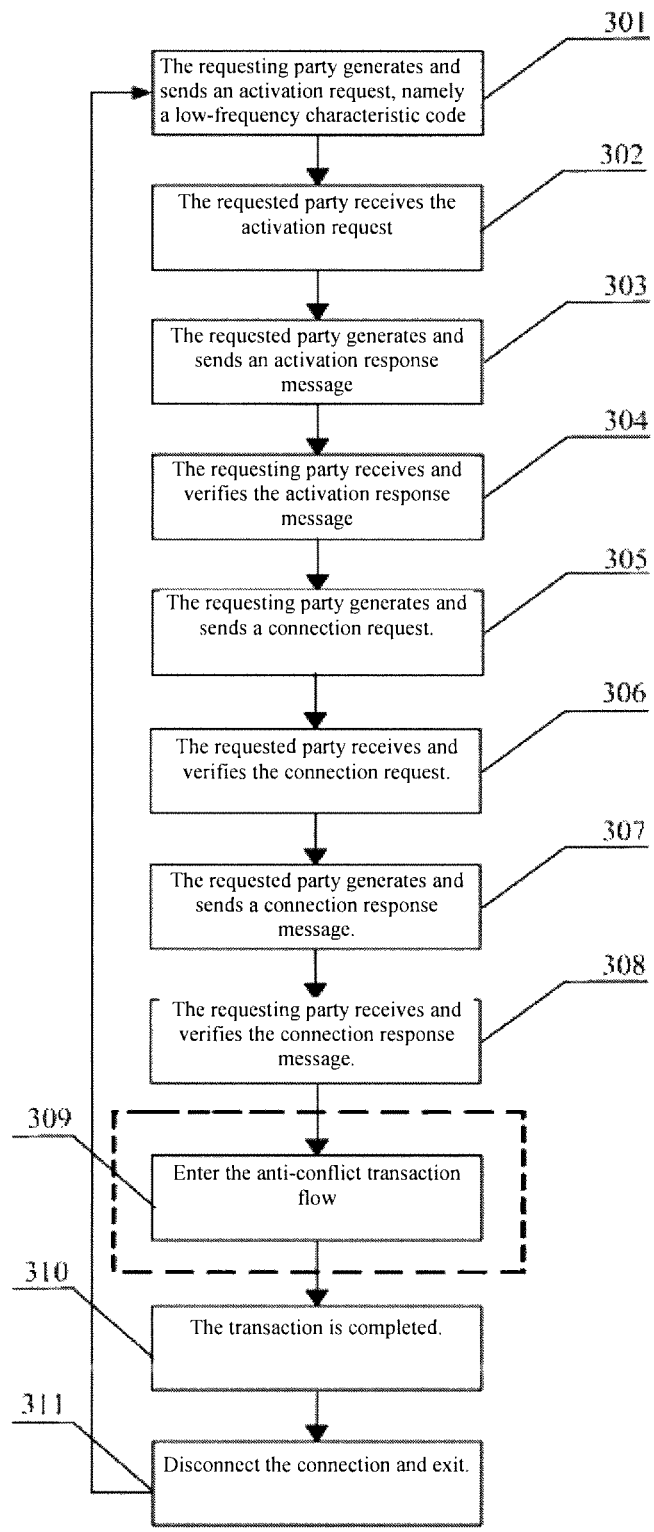
FIG. 3 is a flow chart of the method for accessing radio frequency communication with low-frequency magnetic communication according to an embodiment of the present invention.

FIG. 3 is a flow chart of the method for accessing radio frequency communication with low-frequency magnetic communication according to an embodiment of the present invention. As shown in FIG. 3, in this embodiment, the method for accessing radio frequency communication with low-frequency magnetic communication comprises the following steps:

Step 301: the requesting party generates and sends an activation request, namely a low-frequency characteristic code;

The activation request herein is sent through a low-frequency channel, the activation request is namely a low-frequency characteristic code, wherein said low-frequency characteristic code comprises a first random number RN1 generated by the requesting party. Preferably, the length of said low-frequency characteristic code is shorter than or equal to 2 bytes. More preferably, to speed up the access rate, the low-frequency characteristic code may comprise only the first random number RN1, and the length of the first random number RN1 is 1 byte. Since the low-frequency characteristic code comprises a random number, and the random number constantly changes, it can be ensured that the low-frequency characteristic code is different in every access authentication.

The requesting party keeps sending the activation request, and when the requested party enters the allowed access range, the requested party begins to respond.

Step 302: the requested party receives the activation request;

The requested party receives the activation request through the low-frequency channel.

Step 303: the requested party generates and sends an activation response message;

The requested party sends the activation response message on a first radio frequency communication address add1 through the radio frequency channel, wherein the activation response message comprises a second random number RN2 generated by the requested party and an identity identifier of the requested party ID2.

Specifically, Step 303 may comprise the following sub-steps:

Step 31, the requested party generates a second random number RN2;

Preferably, the length of said second random number RN2 may be 4 bytes.

Step 32, the requested party calculates the frequency of the radio frequency communication according to the frequency calculation method predetermined by the two parties and based on the first random number RN1 in said activation request and the maximum number of frequency points supported by the radio frequency channel;

Preferably, said frequency calculation method is: with the maximum number of frequency points supported by the radio frequency channel as the mode, performing an operation to obtain remainder on said first random number RN1, the obtained remainder corresponds to the numbering of the frequency used by the radio frequency communication, and said frequency of the radio frequency communication is obtained according to said numbering.

Step 33, the requested party calculates the first radio frequency communication address add1 according to the address calculation method predetermined by the two parties and based on the first random number RN1;

Preferably, said address calculation method of the first radio frequency communication address add1 is: with said first random number RN1 as input, performing a predetermined one-way function operation, and making all or a part of the obtained operational results as the first radio frequency communication address addl. Furthermore, the SHA-1 algorithm can be used as the calculation method for the first radio frequency communication address add1, and the first 5 bytes of the result are taken as the first radio frequency communication address add 1.

Step 34, the requested party generates a first encryption identifier ALG1, said first encryption identifier ALG1 containing the method to encrypt transaction sessions selected by the requested party (i.e. whether or not encrypt) and the supporting encryption algorithm;

Preferably, if ALG1=0, it means that there is no encryption; if ALG1≠0, it means that encryption is carried out using the algorithm identified by ALG1.

Step 35, the requested party uses said second random number RN2, the identity identifier of the requested party ID2 and the first encryption identifier ALG1 as the encryption input, uses said first random number RN1 and second random number RN2 as the encryption key, adopts a predetermined encryption algorithm to perform the encryption operation, and takes the first 4 bytes of the encryption result as the first check code MAC1;

Preferably, the encryption input is (RN2||ID2||ALG1), and the encryption key is (RN1||RN2), wherein "||" represents concatenation.

Step 36, the requested party generates an activation response message, said activation response message comprising said second random number RN2, the identity identifier of the requested party ID2, the first encryption identifier ALG1 and the first check code MAC1;

Step 37, the requested party sends said activation response message on the first radio frequency communication address add1 at the frequency of the radio frequency communication through the radio frequency channel.

Step 304: the requesting party receives and verifies the activation response message;

The requesting party receives the activation response message sent by the requested party on the first radio frequency communication address add1 through the radio frequency channel, and performs the verification. If the verification is passed, then go to Step 305; otherwise, this access process is terminated.

Specifically, Step 304 may comprise the following sub-steps:

Step 41, the requesting party calculates the frequency of the radio frequency communication according to the frequency calculation method predetermined by the two parties and based on the first random number RN1 and the maximum number of frequency points supported by the radio frequency channel, wherein the frequency calculation method is the same as the frequency calculation method in Step 32;

Step 42, the requesting party calculates the first radio frequency communication address add1 according to the address calculation method predetermined by the two parties and based on the first random number RN1;

Step 43, the requesting party receives said activation response message sent by the requested party on the first radio frequency communication address add1 at the frequency of the radio frequency communication through the radio frequency channel;

Step 44, the requesting party uses the second random number RN2, the identity identifier of the requested party ID2 and the first encryption identifier ALG1 in said activation response message as the encryption input, uses said first random number RN1 and second random number RN2 as the encryption key, adopts a predetermined algorithm to perform the encryption operation, takes the first 4 bytes of the encryption result as the first check code MAC1, and then compares said first check code MAC1 with the first check code MAC1 contained in said activation response message, if the two are identical, then the verification is passed, and go to Step 305; otherwise, the access is incorrect and this access process is terminated.

Step 305, the requesting party generates and sends a connection request;

The requesting party sends the connection request on the second radio frequency communication address add2 through the radio frequency channel, the connection request containing a third random number RN3 generated by the requesting party.

Specifically, Step 305 may comprise the following substeps:

Step 51, the requesting party generates a third random number RN3;

Step 52, the requesting party generates a second encryption identifier ALG2, said second encryption identifier ALG2 containing the method to encrypt transaction sessions selected by the requesting party and the supporting encryption algorithm;

Preferably, the same encryption method and algorithm are selected for the second encryption identifier ALG2 as for the first encryption identifier ALG1. If it is impossible to keep them the same, a new same encryption method and algorithm will be selected. If the requesting party agrees with the encryption selection made by the requested party, then ALG2=ALG1 is set. In such a circumstance, if ALG2=0, it means that the requesting party similarly chooses not to encrypt; if ALG2≠0, it means that the requesting party chooses the same algorithm as the requested party does for encryption. If the requesting party does not agree with the encryption selection made by the requested party, then another ALG2 can be selected (ALG2≠ALG1). In such a circumstance, if ALG2=0, it means that the requesting party chooses not to encrypt; if ALG2≠4, it means that the requesting party chooses a different algorithm from the one selected by the requested party for encryption.

Step 53, the requesting party uses said third random number RN3, the identity identifier of the requesting party ID1 and said second encryption identifier ALG2 as the encryption input, uses said first random number RN1, second random number RN2 and third random number RN3 as the encryption key, adopts a predetermined encryption algorithm to perform the encryption operation, and takes the first 4 bytes of the encryption result as the second check code MAC2;

Preferably, the encryption input is (RN3∥ID1∥ALG2), and the encryption key is (RN1∥RN2∥RN3), wherein "∥" represents concatenation.

Step 54, the requesting party generates a connection request, said connection request containing said third random number RN3, the identity identifier of the requesting party ID1, the second encryption identifier ALG2 and the second check code MAC2;

Step 55, the requesting party calculates the second radio frequency communication address add2 according to the address calculation method predetermined by the two parties and based on the first random number RN1 and second random number RN2;

The calculation method of the second radio frequency communication address add2 is: with said first random number RN1 and second random number RN2 as input, performing a predetermined one-way function operation, and making all or a part of the obtained operational results as the second radio frequency communication address add2. Preferably, the SHA-1 algorithm can be used as the calculation method for the second radio frequency communication address add2, the input is (RN1∥RN2), and the first 5 bytes of the result are taken as the second radio frequency communication address add2. Alternatively, the calculation method of the second radio frequency communication address add2 may also be: intercepting all or a part of (RN1∥RN2) as the second radio frequency communication address add2. Preferably, (RN1∥RN2) is 5 bytes and directly used as add2.

Step 56, the requesting party sends said connection request on the second radio frequency communication address add2 at the frequency of the radio frequency communication through the radio frequency channel.

Step 306: the requested party receives and verifies the connection request;

The requested party receives the connection request sent by the requesting party on the second radio frequency communication address add2 through the radio frequency channel, and performs the verification, if the verification is passed, then go to Step 307; otherwise, this access process is terminated.

Specifically, Step 306 may comprise the following substeps:

Step 61, the requested party calculates the second radio frequency communication address add2 according to the address calculation method predetermined by the two parties and based on the first random number RN1 and second random number RN2; the address calculation method in Step 61 is the same as the address calculation method in Step 55.

Step 62, the requested party receives said connection request on the second radio frequency communication address add2 at the frequency of the radio frequency communication through the radio frequency channel;

Step 63, the requested party uses the third random number RN3, the identity identifier of the requesting party ID1 and the second encryption identifier ALG2 in said connection request as the encryption input, uses said first random number RN1, second random number RN2 and third random number RN3 as the encryption key, adopts a predetermined encryption algorithm to perform the encryption operation, takes the first 4 bytes of the encryption result as the second check code MAC2, and then compares said second check code MAC2 with the second check code MAC2 contained in said connection request, if the two are identical, then the verification is passed; otherwise, the verification is failed.

Step 307, the requested party generates and sends a connection response message;

The requested party sends said connection response message on the second radio frequency communication address add2 through the radio frequency channel.

Specifically, Step 307 may comprise the following substeps:

Step 71, the requested party sets a status identifier SFF of connection successful/failed according to the verification result of the second check code MAC2. If the second check code MAC2 passes the verification, then said status identifier SFF of connection successful/failed is set to connection successful, and go to Step 72; otherwise, said status identifier SFF of connection successful/failed is set to connection failed, and go to Step 73;

Step 72, the requested party generates a third encryption identifier ALG3, said third encryption identifier ALG3 containing the method to encrypt transaction sessions finally selected by the requested party and the supporting encryption algorithm;

The third encryption identifier ALG3 can either be the same as or different from the second encryption identifier ALG2 selected by the requesting party in the connection request. If the requested party agrees with the encryption selection made by the requesting party, then ALG3=ALG2 is set. In such a circumstance, if ALG3=0, it means that the requested party ultimately chooses not to encrypt, just as the requesting party does; if ALG3≠0, it means that the requested party ultimately chooses the same algorithm as the one specified by ALG2 selected by the requesting party in the connection request for encryption. If the requested party does not agree with the encryption selection made by the requesting party, then only ALG3=0 can be set, which means that the requested party ultimately chooses not to encrypt. Therefore, it can be seen that the strategy that the requested party has the priority is adopted in the session encryption algorithm consultation process according to the present invention.

Step 73, the requested party uses the third random number RN3, the status identifier SFF of connection successful/failed and the third encryption identifier ALG3 as the encryption input, uses said first random number RN1, second random number RN2 and third random number RN3 as the encryption key, adopts a predetermined encryption algorithm to perform the encryption operation, and takes the first 4 bytes of the encryption result as the third check code MAC3;

Preferably, the encryption input is (RN3||SFF||ALG3), and the encryption key is (RN1||RN2||RN3), wherein "||" represents concatenation.

Step 74, the requested party generates a connection response message, said connection response message containing the status identifier SFF of connection successful/failed, the third encryption identifier ALG3 and the third check code MAC3;

Step 75, the requested party sends said connection response message on the second radio frequency communication address add2 through the radio frequency channel.

Step 308: the requesting party receives and verifies the connection response message;

The requesting party receives the connection response message on the second radio frequency communication address add2 through the radio frequency channel, and verifies whether the access is successful, if the access is successful, then go to Step 309; otherwise, this access process is terminated.

Specifically, Step 308 may comprise the following substeps:

Step 81, the requesting party receives said connection response message on the second radio frequency communication address add2 through the radio frequency channel;

Step 82, the requesting party uses the third random number RN3, the status identifier SFF of connection successful/failed and the third encryption identifier ALG3 in said connection response message as the encryption input, uses said first random number RN1, second random number RN2 and third random number RN3 as the encryption key, adopts a predetermined encryption algorithm to perform the encryption operation, takes the first 4 bytes of the encryption result as the third check code MAC3, and then compares said third check code MAC3 with the third check code MAC3 contained in said connection response message, if the two are identical, then the verification is passed, and go to Step 83; otherwise, the verification is failed and this access process is terminated;

Step 83, the requesting party determines whether the access by the requested party is successful or not based on the status identifier of connection successful/failed in said connection response message, if the access fails, then this access process is terminated; otherwise, go to Step 309.

At this point, both the requesting party and the requested party have completed rapid and secure access authentication and the consultation process of the encryption algorithm and session keys, and enter the subsequent transaction process flow.

Step 309, enter the anti-conflict transaction flow;

The requesting party and the requested party conduct transactions on the second radio frequency communication address add2 through the radio frequency channel. If the transaction session needs to be encrypted, the random numbers (RN1, RN2, and RN3) that the two parties have exchanged in the access authentication phase may be used to generate a session encryption key in a certain way. Preferably, said session encryption key is 8-bytes (RN1||RN2||RN3) or 16-bytes (RN1||RN2||RN3||RN1||RN2||RN3) wherein (RN1||RN2||RN3) is the $\overline{\text{bit-by-bit}}$ inversion of $(\overline{\text{RN1}||\text{RN2}||\text{RN3}})$.

Step 310, the transaction is completed;

Step 311, disconnect the connection and exit.

It can be seen from the above description that the present invention not only makes full use of the advantages of low-frequency magnetic communication in range control, but also speeds up the access rate as much as possible, thereby increasing the response rate of the entire transaction, improving user satisfaction and ensuring the access security and the confidentiality of transaction session data transmission.

The above description is only a preferred embodiment of the present invention, which is not used to limit the present invention. All changes, equivalent substitutions and improvements made within the spirit and principle of the present invention shall be encompassed in the claims of the present invention.

The invention claimed is:

1. A method for accessing to radio frequency communication with low-frequency magnetic communication, comprising:

Step a: a requesting party, through a low-frequency channel, sends an activation request which is a low-frequency characteristic code, wherein said low-frequency characteristic code comprises a first random number generated by the requesting party, wherein the length of said low-frequency characteristic code is shorter than or equal to 2 bytes, and the length of said first random number is 1 byte;

Step b: a requested party receives the activation request through the low-frequency channel, generates an activation response message and sends the activation response message on a first radio frequency communication address through the radio frequency channel, wherein the activation response message comprises a second random number generated by the requested party and an identity identifier of the requested party;

Step c: the requesting party receives the activation response message on the first radio frequency communication address through the radio frequency channel and performs the verification, generates a connection request if the verification is passed, and sends the connection request on a second radio frequency communication address through the radio frequency channel, wherein the connection request comprises a third random number;

Step d: the requested party receives the connection request on the second radio frequency communication address through the radio frequency channel and performs the verification, generates a connection response message if the verification is passed, and sends the connection response message on the second radio frequency communication address through the radio frequency channel; and Step e: the requesting party receives the connection response message on the second radio frequency communication address through the radio frequency channel, verifies whether a connection is successful, and trades with the requested party on the second radio frequency communication address through the radio frequency channel if the connection is successful.

2. The method for accessing to radio frequency communication with low-frequency magnetic communication as set forth in claim 1, wherein said low-frequency characteristic code only comprises said first random number.

3. The method for accessing to radio frequency communication with low-frequency magnetic communication as set forth in claim 1, wherein said Step b comprises:

Step b1, the requested party receives the activation request through the low-frequency channel;

Step b2, the requested party generates the second random number;

Step b3, the requested party calculates the frequency of the radio frequency communication according to a frequency calculation method predetermined by the two parties and based on the first random number in said activation request and a maximum number of frequency points supported by the radio frequency channel;

Step b4, the requested party calculates the first radio frequency communication address according to an address calculation method predetermined by the two parties and based on the first random number;

Step b5, the requested party generates a first encryption identifier, said first encryption identifier containing a method to encrypt transaction sessions selected by the requested party and an encryption algorithm supported by the requested party;

Step b6, the requested party uses said second random number, the identity identifier of the requested party and said first encryption identifier as an encryption input, uses said first random number and said second random number as an encryption key, adopts a predetermined encryption algorithm to perform an encryption operation, and takes the first 4 bytes of the encryption result as a first check code;

Step b7, the requested party generates said activation response message, said activation response message comprising said second random number, the identity identifier of the requested party, the first encryption identifier and the first check code; and Step b8, the requested party sends said activation response message on the first radio frequency communication address using the calculated frequency of the radio frequency communication through the radio frequency channel.

4. The method for accessing to radio frequency communication with low-frequency magnetic communication as set forth in claim 3, wherein in said Step b2, the length of said second random number is 4 bytes.

5. The method for accessing to radio frequency communication with low-frequency magnetic communication as set forth in claim 3, wherein in said Step b3, said predetermined frequency calculation method comprises: with the maximum number of frequency points supported by the radio frequency channel as a mode, performing an operation to obtain remainder on said first random number, the obtained remainder corresponds to the numbering of the frequency used by the radio frequency communication, and said frequency of the radio frequency communication is obtained according to said numbering.

6. The method for accessing to radio frequency communication with low-frequency magnetic communication as set forth in claim 3, wherein in said Step b5, there is no encryption when said first encryption identifier equals to 0, and there is encryption and the encryption is performed with an algorithm identified by the first encryption identifier when said first encryption identifier does not equal to 0.

7. The method for accessing to radio frequency communication with low-frequency magnetic communication as set forth in claim 3, wherein in said Step b6, the encryption input is RN2||ID2||ALG1, and the encryption key is RN1||RN2, wherein "||" represents concatenation, RN2 is said second random number, ID2 is said identity identifier of the requested party, ALG1 is said first encryption identifier, and RN1 is said first random number.

8. The method for accessing to radio frequency communication with low-frequency magnetic communication as set forth in claim 3, wherein said Step c comprises:

Step c1, the requesting party calculates the frequency of the radio frequency communication according to the frequency calculation method predetermined by the two parties and based on the first random number and the maximum number of frequency points supported by the radio frequency channel;

Step c2, the requesting party calculates the first radio frequency communication address according to the address calculation method predetermined by the two parties and based on the first random number;

Step c3, the requesting party receives said activation response message on the first radio frequency communication address using the calculated frequency of the radio frequency communication through the radio frequency channel;

Step c4, the requesting party uses the second random number, the identity identifier of the requested party and said first encryption identifier in said activation response message as the encryption input, uses said first random number and said second random number as the encryption key, adopts a predetermined algorithm to perform the encryption operation, takes the first 4 bytes of the encryption result as a first check code, and compares said first check code with the first check code contained in said activation response message;

Step c5, if the first check code is not identical with the first check code contained in said activation response message, the access is incorrect and the access process is terminated; and if the first check code is identical with the first check code contained in said activation response message, the verification is passed and the requesting party generates the third random number;

Step c6, the requesting party generates a second encryption identifier, said second encryption identifier containing a method to encrypt transaction sessions selected by the requesting party and an encryption algorithm supported by the requesting party;

Step c7, the requesting party uses said third random number, the identity identifier of the requesting party and said second encryption identifier as the encryption input, uses said first random number, said second random number and said third random number as the encryption key, adopts a predetermined encryption algorithm to perform the encryption operation, and takes the first 4 bytes of the encryption result as a second check code;

Step c8, the requesting party generates said connection request, said connection request containing said third random number, the identity identifier of the requesting party, the second encryption identifier and the second check code;

Step c9, the requesting party calculates the second radio frequency communication address according to the address calculation method predetermined by the two parties and based on the first random number and the second random number; and Step c10, the requesting party sends said connection request on the second radio frequency communication address at the frequency of the radio frequency communication through the radio frequency channel.

9. The method for accessing to radio frequency communication with low-frequency magnetic communication as set forth in claim 8, wherein in said Step c5, the length of said third random number is 3 bytes.

10. The method for accessing to radio frequency communication with low-frequency magnetic communication as set forth in claim 8, wherein in said Step c7, the encryption input is RN3||ID1||ALG2, and the encryption key is RN1||RN2||RN3, wherein "||" represents concatenation, RN3 is said third random number, ID1 is said identity identifier of the requesting party, ALG2 is said second encryption identifier, RN1 is said first random number, and RN2 is said second random number.

11. The method for accessing to radio frequency communication with low-frequency magnetic communication as set forth in claim 8, wherein in said Step c9, said calculation method of the second radio frequency communication address comprises: with said first random number and second random number as input, performing a predetermined one-way function operation, and making all or a part of the obtained operational results as the second radio frequency communication address.

12. The method for accessing to radio frequency communication with low-frequency magnetic communication as set forth in claim 8, wherein in said Step c9, said calculation method of the second radio frequency communication address comprises: taking all or a part of RN1||RN2 as the second radio frequency communication address, wherein "||" represents concatenation, RN1 is said first random number, and RN2 is said second random number.

13. The method for accessing to radio frequency communication with low-frequency magnetic communication as set forth in claim 3 or 8, wherein said Step d comprises:

Step d1, the requested party calculates the second radio frequency communication address according to the address calculation method predetermined by the two parties and based on the first random number and the second random number;

Step d2, the requested party receives said connection request on the second radio frequency communication address at the frequency of the radio frequency communication through the radio frequency channel;

Step d3, the requested party uses the third random number, the identity identifier of the requesting party and the second encryption identifier in said connection request as the encryption input, uses said first random number, said second random number and said third random number as the encryption key, adopts a predetermined encryption algorithm to perform the encryption operation, takes the first 4 bytes of the encryption result as the second check code, and compares said second check code with the second check code contained in said connection request, if the two are identical, the verification is passed; otherwise, the verification is failed;

Step d4, the requested party sets a status identifier of connection successful/failed according to the verification result of the second check code; if the second check code passes the verification, said status identifier of connection successful/failed is set to connection successful; otherwise, said status identifier of connection successful/failed is set to connection failed;

Step d5, the requested party generates a third encryption identifier, said third encryption identifier containing a method to encrypt transaction sessions finally selected by the requested party and an encryption algorithm supported by the requested party;

Step d6, the requested party uses the third random number, the status identifier of connection successful/failed and the third encryption identifier as the encryption input, uses said first random number, said second random number and said third random number as the encryption key, adopts a predetermined encryption algorithm to perform the encryption operation, and takes the first 4 bytes of the encryption result as a third check code;

Step d7, the requested party generates a connection response message, said connection response message containing the status identifier of connection successful/failed, the third encryption identifier and the third check code; and Step d8, the requested party sends said connection response message on the second radio frequency communication address through the radio frequency channel.

14. The method for accessing to radio frequency communication with low-frequency magnetic communication as set forth in claim 13, wherein in said Step d6, the encryption input is RN3||SFF||ALG3, and the encryption key is RN1||RN2||RN3, wherein "||" represents concatenation, RN3 is said third random number, SFF is said status identifier of connection successful/failed, ALG3 is said third encryption identifier, RN1 is said first random number, and RN2 is said second random number.

15. The method for accessing to radio frequency communication with low-frequency magnetic communication as set forth in claim 1, wherein said Step e comprises:

Step e1, the requesting party receives said connection response message on the second radio frequency communication address through the radio frequency channel;

Step e2, the requesting party uses the third random number, a status identifier of connection successful/failed and a third encryption identifier in said connection response message as an encryption input, uses said first random number, said second random number and said third random number as an encryption key, adopts a predetermined encryption algorithm to perform the encryption operation, takes the first 4 bytes of the encryption result as a third check code, and compares said third check code with a third check code contained in said connection response message;

Step e3, if the third check code is not identical with the third check code contained in said connection response message, the verification is failed and the access process is terminated; and if the third check code is identical with the third check code contained in said connection response message, the requesting party determines whether the connection by the requested party is successful or not based on the status identifier of connection successful/failed in said connection response message;

Step e4, if the connection by the requested party is not successful, the connection process is terminated; and if the connection by the requested party is successful, the requesting party and the requested party conduct transactions on the second radio frequency communication address through the radio frequency channel.

16. The method for accessing to radio frequency communication with low-frequency magnetic communication as set forth in claim 15, wherein in said Step e4, a session encryption key is used in said transactions.

17. The method for accessing to radio frequency communication with low-frequency magnetic communication as set forth in claim 16, wherein said session encryption key is 8-bytes RN1||RN2||RN3 or 16-bytes RN1||RN2||RN3||$\overline{RN1||RN2||RN3}$, wherein "||" represents concatenation, $\overline{RN1||RN2||RN3}$ is the bit-by-bit inversion of RN1||RN2||RN3, RN1 is said first random number, RN2 is said second random number, and RN3 is said third random number.

* * * * *